UNITED STATES PATENT OFFICE.

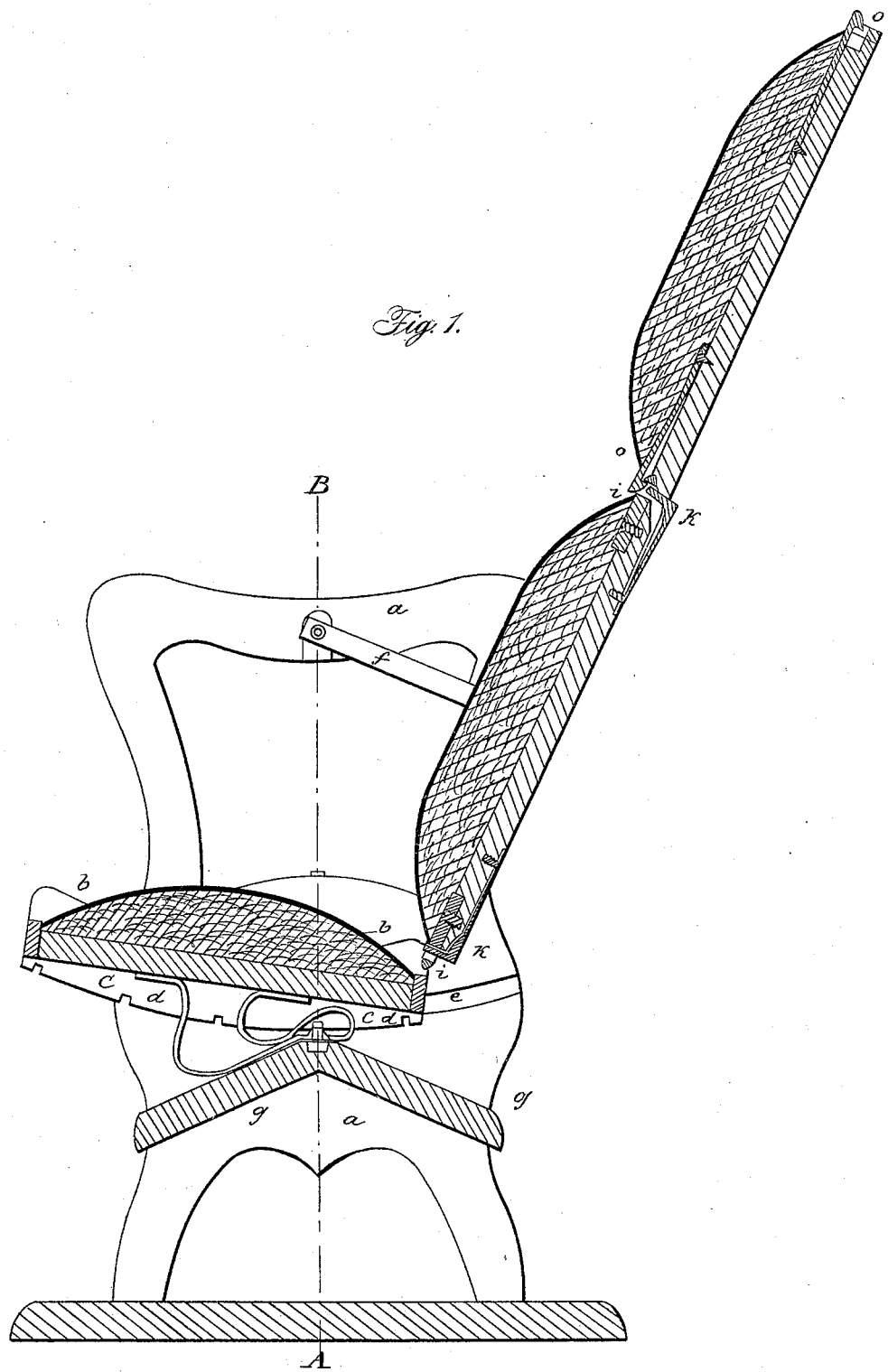

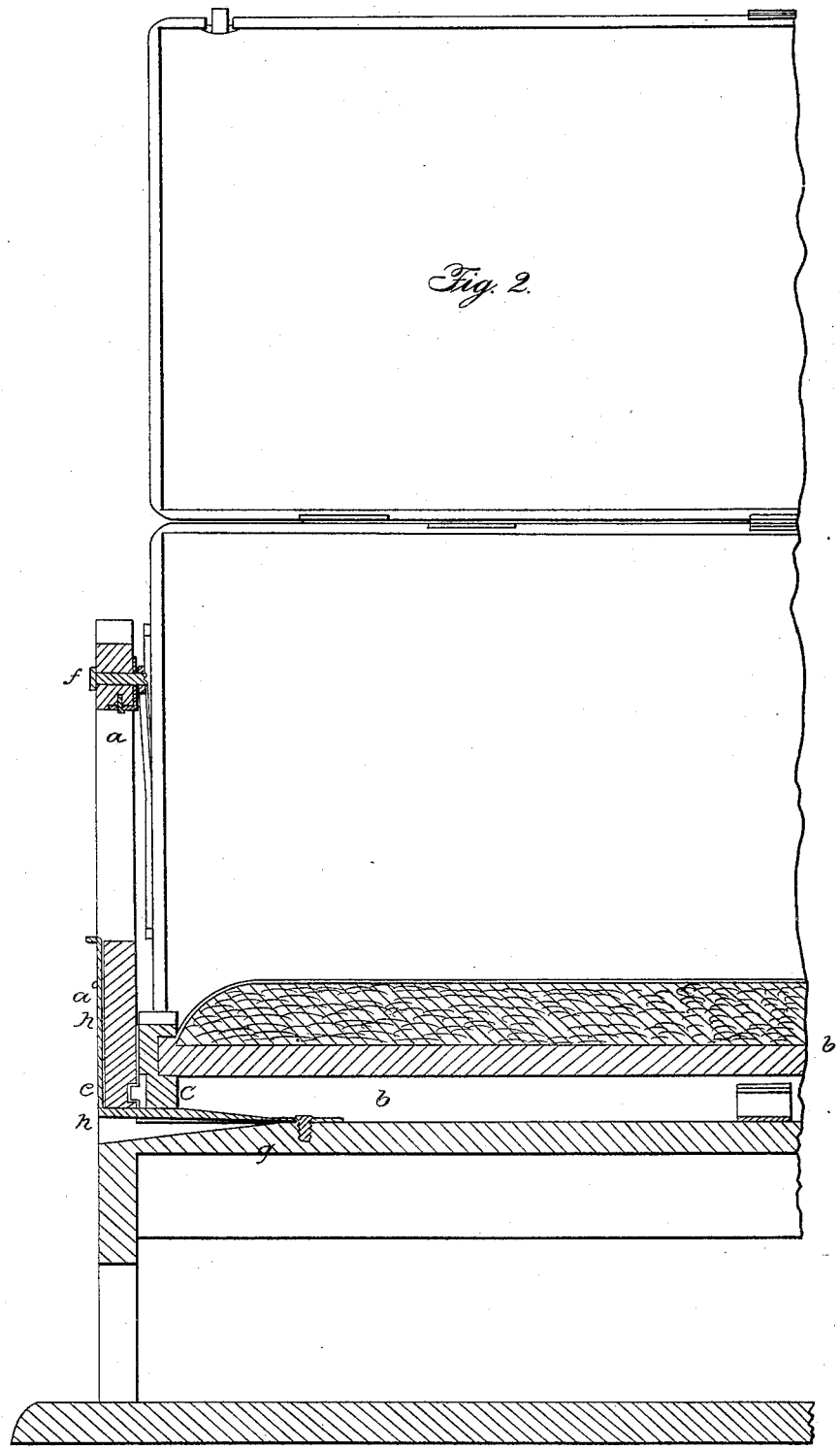

JOHN BRIGGS, OF BOSTON, MASSACHUSETTS.

RAILROAD-CAR SEAT.

Specification of Letters Patent No. 9,583, dated February 15, 1853.

*To all whom it may concern:*

Be it known that I, JOHN BRIGGS, of Boston, in the county of Suffolk and State of Massachusetts, have invented certain new and useful Improvements in Railroad-Car Seats, and that the following description, taken in connection with the accompanying drawings, hereinafter referred to, forms a full and exact specification of the same, wherein I have set forth the nature and principles of my said improvements, by which my invention may be distinguished from others of a similar class, together with such parts as I claim and desire to have secured to me by Letters Patent.

The figures of the accompanying plate of drawings represent my improvements.

Figure 1 is a transverse vertical section of my improved car seat. Fig. 2, is a detail sectional view of the same taken in the plane of the line A B, Fig. 1.

My improvements are made upon a car seat for which Letters Patent of the United States were granted to me bearing date the 6th day of July 1852 and described in the schedule annexed to the same.

The essential feature of my improvements, consists in a curved sliding seat, upon which the back rests, which slides in or out, and can be fastened in any desired position, as will be hereinafter explained.

$a\ a$ in the drawings represents the framework of the chair and $b\ b$ the seat to the bottom of which is attached a curved bar $c\ c$, with notches $d, d$ &c. This bar $c\ c$ or a projecting lip of the same, travels, as the seat is moved in or out, in the grooved arc $e\ e$ formed in the side framework $a\ a$. The back, instead of being supported by having its arms $f\ f$ bear upon projecting springs, as described in the schedule before referred to, rests entirely upon the edge of the seat, and has its inclination varied according to the position of the said seat.

$g, g$ are the foot rests, placed directly under the chair for the convenience of the occupant of the adjacent seat, the seat when it is moved out, leaving a sufficient space for the purpose.

The curved bar $c\ c$, and consequently the seat, is held in any desired position by the bent springs $h\ h$—$h\ h$, attached to the top of the foot rests $g, g$, and extending to the side of the seat, so as to be easily reached, as shown in Fig. 2. These springs enter any of the notches $d, d$ &c., and hold the seat firmly.

The spring lips $o, o$ by which the back is held when open, enter a metallic socket $i, i$ from which they can easily be relived, when the back is to be folded up, by pressing the cam springs $k, k$—$k\ k$ attached to the outside of the back.

It will be evident that there are a variety of ways in which the seat can be held in its position, besides the springs operating as above set forth. The spring lips $o, o$ &c. can also be made to slide up or down in the back, so as to be kept out of the way.

Having thus described my improvements in car seats I shall state my claims as follows:

What I claim as my invention and desire to have secured to me by Letters Patent is—

A seat sliding in an arc formed in the framework of the chair and fastened in any desired position, as above set forth, whereby the back is made to follow the motion of the seat in such manner as to preserve a constant or nearly constant connection and angle therewith.

JOHN BRIGGS.

Witnesses:
JOSEPH GAVETT,
ROBERT L. HARRIS.